Oct. 28, 1969     W. F. TAYLOR     3,475,126

LOW-TEMPERATURE, LOW-PRESSURE VAPOR REFORMING

Filed March 2, 1967

W. F. TAYLOR    INVENTOR

BY Henry Berk

PATENT ATTORNEY

United States Patent Office 3,475,126
Patented Oct. 28, 1969

3,475,126
LOW-TEMPERATURE, LOW-PRESSURE
VAPOR REFORMING
William F. Taylor, Scotch Plains, N.J., assignor to Esso Research and Engineering Company, a corporation of Delaware
Continuation-in-part of application Ser. No. 385,931, July 29, 1964. This application Mar. 2, 1967, Ser. No. 620,153
Int. Cl. C01b 1/11
U.S. Cl. 23—213                    5 Claims

ABSTRACT OF THE DISCLOSURE

A hydrogen gas product is produced by reaction of vaporized normally liquid hydrocarbon with water vapor in the presence of a nickel reforming catalyst at low reaction temperatures, e.g., 110° to 500° F. and low pressures, e.g., 5 to 25 p.s.i.a., and low conversion levels, e.g., 0.1 to 20 wt. percent of the hydrocarbon per pass.

Cross reference

This application is a continuation-in-part of Ser. No. 385,931, filed July 29, 1964, now abandoned, by William F. Taylor on producing gas rich in hydrogen from vaporized hydrocarbons catalytically reacted with water vapor in the presence of a nickel reforming catalyst at low temperatures and low pressures rather than from a liquid phase reaction which is set forth also in said application Ser. No. 385,931.

Vapor phase reforming of hydrocarbons with water vapor in the presence of a solid catalyst at low temperatures and low pressures, e.g., subatmospheric pressures, for producing a gas product rich in hydrogen and low in gaseous hydrocarbon is a novel achievement.

In contrast to conventional higher temperature and higher pressure vapor phase reforming processes, the vapor phase reforming under reduced pressure conditions is more selective in forming hydrogen for the same conversion rate. Under low temperature and pressure reaction conditions, a lower amount of heat energy is used for vaporizing the liquid feed. The low pressure gas product can be separated from unconverted condensate under reduced pressure and be compressed for purification or use under high pressure if desired.

Background

The reaction of gaseous hydrocarbons, e.g., methane to butane or vaporized normally liquid hydrocarbons, e.g., naphtha, with steam at above 500° C. (932° F.) in the presence of a catalyst to form hydrogen, methane with carbon oxides as principal product is well known as a steam-reforming process.

In steam-reforming of gaseous or vaporized hydrocarbons, high reaction temperatures favor hydrogen production relative to methane, and catalysts with sufficient activity to insure high conversion rates are known to have been used to make such a reaction go to completion at temperatures above 1000° F.

It is also known that a gas rich in hydrogen can be produced at lower temperatures in the range of 550° to 950° F. by reaction of vaporized hydrocarbons with steam at elevated pressures of 150 to 1500 p.s.i.a. when the conversion level is below 40%, i.e., with shortened time of contact in the presence of highly active catalysts to prevent increased formation of methane, such as results from the methanation reaction of hydrogen with carbon monoxide as reaction is expanded to approach equilibrium.

Summary of the invention

The low-temperature, low-pressure vapor phase reforming consists in contacting a nickel catalyst of suitable high reforming activity with a vaporized feed mixture of hydrocarbon vapor and water vapor at low temperature, preferably in the range of 110° to 500° F. at about atmospheric pressure or in the range of 5 to 25 p.s.i.a., the vapor mixture being easily preheated to the desired reaction temperature and being drawn through a bed of the catalyst by a vacuum pump or other suitable suction creating device which creates a substantial pressure drop from atmospheric to subatmospheric pressure across the bed. The gas-vapor mixture which flows through the catalyst bed contains the gas generated (principally $H_2$ and $CO_2$) with a substantial amount of original vapor mixture unreacted. The gas-vapor mixture is then cooled or chilled by being passed through a condenser in which heat is removed from said mixture to condense out a substantial portion of the unreacted vapor components as hydrocarbon liquid oil and water. The remaining gas-vapor mixture is compressed to any desired pressure and the compressed gas-vapor mixture is chilled to remove remaining condensible vapor components. The liquid condensates of water and unconverted hydrocarbon can be recycled for vaporization, heating and repeated reaction in the presence of the catalyst.

In a vapor phase reforming process carried out under relatively high pressure and elevated temperatures, the rate of conversion of the hydrocarbon is generally high, tending to increase for a given feed rate and catalyst charge with increasing temperature and pressure. The increased conversion of the hydrocarbon by the catalyst results in the formation of more methane. The heat required for vaporizing and superheating the vapors is of a high magnitude and costly. Subsequent processing of the high temperature gas products for separation of components requires extensive cooling and additional operations to remove undesired components, such as gaseous hydrocarbons and carbon monoxide, which may be present.

Production of hydrogen by reforming at ultra low temperatures with negligible formation of CO and gaseous hydrocarbons was not possible without a catalyst of high activity and without a method for minimizing contact of the gas products with the catalyst under the low temperature conditions so that hydrogen is formed rather than methane. Advantageously, by use of low temperatures and a suitably active reforming catalyst, the vapor reactants undergo reaction almost instantly on contact to form principally hydrogen and carbon dioxide with very little normally gaseous hydrocarbon, e.g., methane, propane and butane.

In using the catalyst at low reaction temperatures, the catalyst life is prolonged because there is less danger of oxidation, sintering or coking.

Highly active catalysts useful for the low temperature partial conversion of the hydrocarbons to obtain principally hydrogen are typified by mixed nickel-alumina and nickel-silica catalysts which have nickel content from 40 to 75 wt. percent, and these mixed catalysts may be promoted by certain metals, e.g., barium, strontium, cesium, cerium, lanthanum, yttrium, iron, potassium, and copper. The proportion of promoter may be between 0.5 to 12 wt. percent of the catalyst.

Since highly active catalysts per se and methods for making them are regarded as known in the prior art, details on all such catalysts are not set forth, but general characterizations and representative examples are given. In general, the highly active nickel catalysts have high nickel surface areas, i.e., 20 to 30 m.²/g. or higher. They are obtained by coprecipitations of nickel with aluminum as hydroxides, carbonates, or basic carbonates from aqueous solutions of nitrate salts by $NH_4HCO_3$, low temperature (200° to 400° F.) drying of the precipitates, and calcining of the dried precipitates in air at low temperatures (600° to 900° F.) followed by activation of the calcined precipitates by hydrogen. The promoters are admixed as decomposable compounds, e.g., hydroxides, carbonates or nitrates with the precipitates. Similarly mixed catalysts of nickel with silica may be prepared using a metasilicate and kieselguhr, in place of aluminum compounds to have the nickel interspersed with $SiO_2$ instead of $Al_2O_3$. The catalyst granules may be 1 to 5 mm. particles or be compressed into pellets or extruded.

As specific examples or catalysts which may be used in the practice of this invention, there can be mentioned: ceria promoted nickel-alumina catalysts, lanthanum promoted nickel-alumina catalysts and cerium-lanthanum promoted nickel-alumina catalysts made in accordance with the procedure set forth in copending commonly assigned application S.N. 317,777; catalytic metals of Group VIII deposited as hydrosilicates on a porous solid support as set forth in commonly assigned copending application S.N. 317,828, now U.S. Patent No. 3,351,566, issued Nov. 7, 1967; potassium, cesium, barium and strontium promoted $Ni-Al_2O_3$ made in accordance with the procedure set forth in the copending commonly assigned application S.N. 317,799, now U.S. Patent No. 3,320,182, issued May 16, 1967; $Ni-Al_2O_3$-Fe made in accordance with the procedure set forth in copending commonly assigned application S.N. 317,800; and $$Ni-ZnCrO_4-Al_2O_3-Ba$$

made in accordance with the procedure set forth in copending commonly assigned application S.N. 365,803, and promoted nickel-alumina catalysts made in accordance with the procedure set forth in copending commonly assigned application S.N. 365,566. Higher nickel content promoted mixed $Ni-Al_2O_3$ catalysts are also highly active for the low temperature partial conversion of hydrocarbons to hydrogen. These catalysts have nickel to aluminum atom ratios usually in the range of 1.5/1 to 4.0/1 and can be promoted by elements from the group consisting of La, Ba, Sr, Ce, Cs, K, Fe, Y and Cu.

Hydrocarbons which can be used as a feed in producing hydrogen include the normally liquid paraffinic hydrocarbons, saturated, unsaturated and cyclic, preferably straight chain saturated hydrocarbons having from 5 to 20 carbon atoms depending on the mode of operation. Examples of hydrocarbons which can be present in the feed include pentane, hexane, heptane, octaine, decane and dodecane.

The hydrocarbon oil feed may include some partially oxygenated hydrocarbons, e.g., alcohols, aldehydes, ketones, esters, and ethers.

Generally, the ratio of water to hydrocarbon is in the range of 0.5 to 1 to 6 to 1 gram moles of water per gram atom of carbon.

From analyses of products, proportions of reactants, and other considerations, the partial conversion yielding high amounts of hydrogen may be regarded as involving the following overall principal reaction paths, assuming that n-hexane is typical of the average hydrocarbon reactant:

(1)   $C_6H_{14} + 6H_2O \rightarrow 13H_2 + 6CO$
(2)   $CO + H_2O \rightleftharpoons CO_2 + H_2$
(3)   $CO + 3H_2 \rightleftharpoons CH_4 + H_2O$ Reaction 1 implies that the hydrocarbon initially decomposes in the presence of $H_2O$ to liberate hydrogen and form an oxide of carbon, presumably carbon monoxide. Following this, the carbon monoxide reacts with water to form carbon dioxide and more hydrogen in the Water Gas Shift reaction 2. The carbon monoxide may also react with hydrogen to form methane and water in the Methanation reaction 3. The thermodynamic equilibrium for reactions 2 and 3 are known to control the product composition at complete hydrocarbon feed conversion. However, reaction 2 is very rapid relative to reaction 1 since the product contains very little carbon monoxide at low conversion levels. Reaction 3 is slow relative to reactions 1 and 2. Reaction 1 is endothermic and reaction 2 slightly exothermic. Reaction 3 is strongly exothermic and tends to increase the temperature in the reaction zone.

In producing hydrogen by the low-temperature, low-pressure reforming, a number of procedures may be employed. The vaporized hydrocarbon water feed may be passed over catalyst or through catalyst beds at a partial conversion level and the effluent gas vapor mixture may be cooled by heat exchange then passed into a separator where condensed unreacted hydrocarbon and water is separated from the gas product, the hydrocarbon being a normally liquid hydrocarbon preferably with a boiling point above the condensation temperature under the reduced pressure. The vaporized reaction mixture may be passed in parallel streams through a number of catalyst beds. The condensate may be fed sequentially through a number of catalyst zones or the condensate may be recycled through the previous catalyst bed.

The hydrogen may be removed selectively from the gas-vapor effluent of the reaction zones by using diffusion membranes, e.g., palladium, palladium-silver or porous tetrafluoroethylene membranes depending on the temperature and pressure of the gaseous mixture.

The catalyst bed may be contained inside diffusional membranes or diffusional membranes may be located in a line where gas product is under pressure.

Although the low-temperature, low-pressure reforming vapor phase procedure requires addition of heat for vaporization of the hydrocarbon and water vapor reactants, it does not require the expenditure of appreciable energy for the flow of liquids to the reactor under pressure. In using a vacuum compressor device for obtaining the reduced pressure there are the compensations of disengaging gas product from condensate more readily and of compressing the gas product in which heat is regained from the compression. Above all, there is the important advantage from using the reduced pressure at the outlet of the reactor in preventing back pressure diffusion of the gas product in the catalyst reaction zone which evidently leads to the improved selectivity toward formation of hydrogen rather than gaseous hydrocarbon.

Description of the drawing

In FIG. 1, conduit 1 admits liquid hydrocarbon oil feed, and conduit 2 admits liquid water feed to conduit 3 wherein the hydrocarbon water feeds are mixed. The mixed hydrocarbon water feeds are passed through heat exchanger 4 to be raised in temperature and are passed through heater 5 to be heated to a desired vapor and reaction temperature before entering reactor 6.

Figure 1:
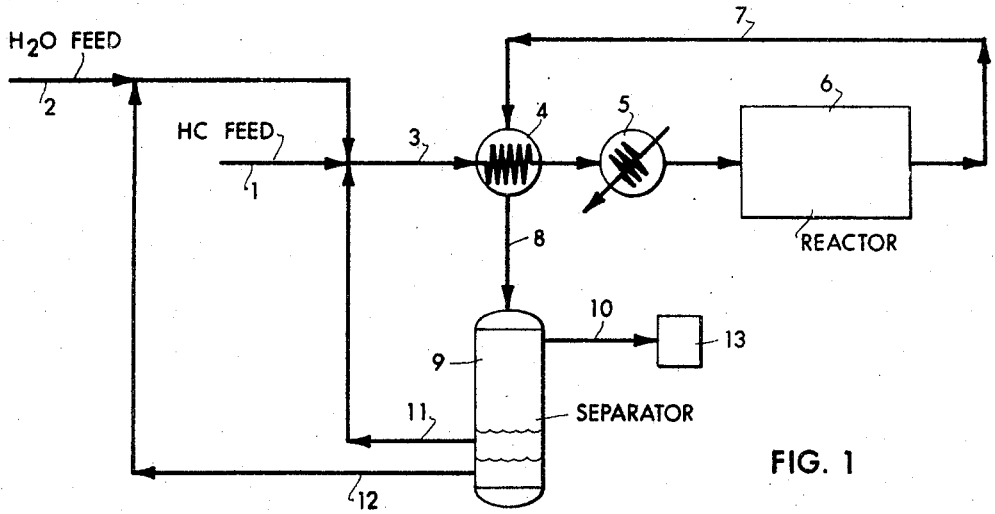
FIG. 1 is a flow diagram of an apparatus useful for the production of hydrogen with the low-temperature, low-pressure reforming of vaporized normally liquid hydrocarbon and water vapor.

Reactor 6 contains a catalyst bed, i.e., a bed of active nickel-containing catalyst particles, or contains a surface coated with catalyst for the reforming reaction.

Product gases generated by the reforming reaction are removed from the reactor 6 by means of conduit 7 and are passed through the heat exchanger 4 where the product gases are cooled by indirect heat exchange with the liquid feed mixture. The product gases and condensate are removed from the heat exchanger 4 through line 8 to the gas-liquid separator 9.

The gas-liquid separator 9 permits removal of product gases which comprise principally $H_2$ and $CO_2$ with a small amount of hydrocarbon gas by way of conduit 10. The unreacted liquid hydrocarbon condensate forms an upper liquid phase which can be withdrawn through conduit 11 from separator 9 for recycling to conduit 1. The lower phase of liquid water collected in separator 9 is withdrawn through conduit 12 and recycled to water feed conduit 2.

The product gases removed from the separator 9 by conduit 10 preferably by a suction device 13 may then be treated for separation of remaining condensible hydrocarbon and/or water vapor by liquefaction and fractionation or they may be used as they are removed from the separator. The gases rich in hydrogen may be used effectively as fuel for a fuel cell. Gaseous hydrocarbon components separated from the $H_2$ product may be used as a heating fuel to undergo combustion for heating the feedstock going into the reactor 6.

Various known solvent feed absorption or adsorption processes may be used to remove carbon dioxide and any small amounts of gaseous hydrocarbons from the hydrogen.

Figure 2:
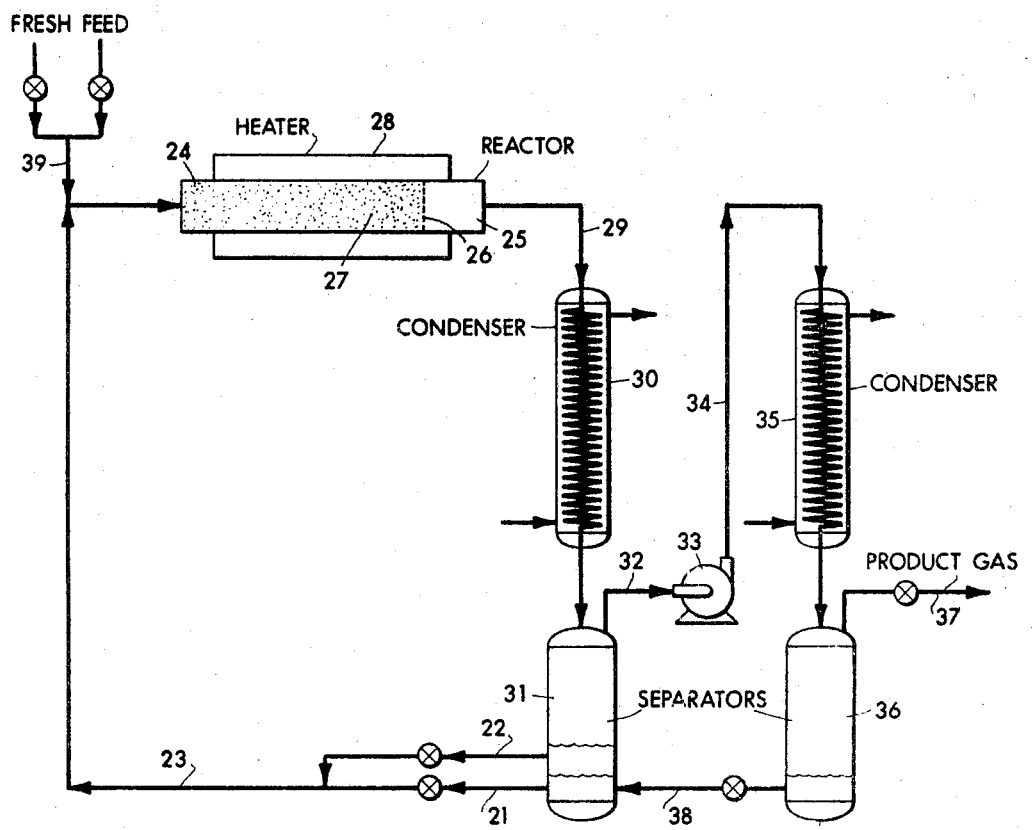
FIG. 2 is a schematic diagram of a simplified system showing a preferred modification in which a vacuum compressor pump is used between a series of condensers in separating condensate from the gas-vapor mixture.

The system shown in FIG. 2 comprises a hydrocarbon feed line 22 and a water feed line 21 which join into line 39 that passes the feed mixture into a preheating zone 24 at the front end of the reaction tube 25. Near the exit end of the tube 25 is located a porous disc 26 and the catalyst bed 27. A bench scale reactor 25 made of quartz was located in a heater 28 in which heat was supplied for vaporizing the feed mixture, heating the vapors to the desired reaction temperature and maintaining the reaction temperature in the catalyst bed 27.

Effluent is drawn from the reactor 28 through conduit 29 which passes through a cooling condenser 30 and discharges the gas product with condensate of the vapors and any remaining vapors into the gas-liquid separator 31 wherein hydrocarbon oil forms an upper layer above a collected water layer.

Gas and uncondensed vapor is withdrawn from separator 31 through conduit 32 by the pump 33 which creates a vacuum on the inlet side and compresses the gas-vapors on the outlet side to force the compressed gas-vapor mixture through conduit 34. Conduit 34 passes through a cooling condenser 35 and discharges the cooled gas and condensate into a second gas-liquid separator 36. Uncondensed gas product principally containing $H_2$ and $CO_2$ is removed through the valved conduit 37. Liquid trapped in the separator 36 may be returned through the valve conduit 38 to separator 31 for separation of phases and recycling of the oil phase and of the liquid water phase at separately measured rates. Various known devices may be used in conjunction with the systems for recovery of heat, controlling temperatures, pressures and flow.

Fresh feed of water and oil may be added by injection from line 39 into line 23 and preheat zone 24.

If the reforming reactor is operated in conjunction with the hydrogen fuel cell, heat for the reforming reaction can be supplied by heat transfer of excess heat from the electrochemical system.

PREFERRED EMBODIMENTS

Example 1.—Promoted reforming catalyst of nickel

A nickel-alumina-La catalyst having an Ni/Al atom ratio close to 1.3:1 is prepared by dissolving 750 grams of $Ni(NO_3)_2 \cdot 6H_2O$ and 740 grams of $Al(NO_3)_3 \cdot 9H_2O$ in 3 liters of deionized water, adding 750 grams $NH_4HCO_3$ to the solution of the nitrate salts heated to 120° F. with stirring, filtering to separate basic carbonate coprecipitate of Ni and Al formed, admixing 93.6 grams of $$La(NO_3)_2 \cdot 6H_2O$$

dissolved in deionized water to the coprecipitate, drying the admixture at 230° F., then calcining the dried admixture in air for 4 hours at 750° F.

Similarly, other promoters, e.g., Ba, are incorporated in these catalysts which in the oxidized state are considered to contain Ni, Al, and the promoter metal as interspersed oxides. Typically these catalysts contain from 40 to 60 wt. percent Ni and 60 to 40 wt. percent $Al_2O_3$ on the dry basis. They have nickel surface areas of 20 to 30 $m.^2/g.$ after reduction.

Example 2.—Vaporized feed system with
Ni-$Al_2O_3$-La catalyst

A nickel-alumina-lanthanum catalyst which contained 42.7 wt. percent Ni and 5.5 wt. percent La prepared as described in Example 1 was charged to a catalytic tube reactor. The catalyst was first prereduced with flowing hydrogen at 900° F. for 2 hours. Then, decane and water were vaporized and fed to the reactor at atmospheric pressure at varying space velocities and temperatures with the following results:

TABLE I

| Reaction Conditions | Run 1 | Run 2 |
|---|---|---|
| Temperature, ° F | 300 | 700 |
| Lbs. water/lb., decane | 4.2 | 4.2 |
| W./hr./W., hr.$^{-1}$ | 0.50 | 0.99 |
| Percent decane converted | 0.2 | 54.3 |
| Dry product gas, mole percent: | | |
| Hydrogen | 76.74 | 62.79 |
| Methane | 0.39 | 13.95 |
| Total $C_2$ | 0.04 | 0.02 |
| Total $C_3$ | 0.02 | 0.01 |
| Total $C_4$ | 0.04 | 0.01 |
| Total $C_5$ | 0.04 | 0.03 |
| Total $C_6$ | 0.01 | 0.02 |
| Carbon dioxide | 22.72 | 22.78 |
| Carbon monoxide | | 0.40 |

Example 3.—Vaporized feed system with
Ni-$Al_2O_3$-Ba catalyst

A nickel-almina-barium catalyst containing 44.3 wt. percent Ni and 5.6 wt. percent barium was charged to a catalytic tube reactor. The catalyst was first prereduced with hydrogen at 900° F. for two hours. Then decane and water were vaporized in proportions of 1 lb. decane/4 lbs. water and fed into the reactor at atmospheric pressure at varying temperatures and space velocities depending on the reduced back pressure to obtain the following results:

TABLE II

| Reaction Conditions | Run 1 | Run 2 | Run 3 |
|---|---|---|---|
| Temperature, ° F | 600 | 400 | 600 |
| Space velocity, W./hr./W., hr.$^{-1}$ | 0.95 | 0.50 | 0.48 |
| Percent decane converted | 16.7 | 0.2 | 11.2 |
| Product analysis, Dry Product gas, mole percent: | | | |
| Hydrogen | 74.13 | 70.48 | 68.5 |
| Methane | 1.45 | 1.49 | 3.43 |
| Total $C_2$ | 0.06 | 0.05 | 0.16 |
| Total $C_3$ | 0.03 | 0.06 | 0.14 |
| Total $C_4$ | 0.05 | 0.06 | 0.10 |
| Total $C_5$ | 0.03 | 0.04 | 0.10 |
| Total $C_6$ | 0.04 | 0.04 | 0.08 |
| Carbon dioxide | 23.67 | 27.78 | 27.47 |
| Carbon monoxide | 0.54 | | |

These runs show that increased flow rate makes the reaction more selective for production of hydrogen, whereas, other things being equal, the lower reaction temperature of 400° F. favors the selective production of hydrogen.

Example 4.—Vaporized feed system with high nickel content catalyst

High nickel content catalysts were prepared as in Example 1 by coprecipitation from solutions of higher proportions of nickel nitrate to aluminum nitrate so that the catalysts contained 3:1 Ni/Al with 0.12 to 0.25 La/Al. These catalysts were prereduced with $H_2$ at 900° F. and tested for effects of flow rate through the catalyst beds and effects of temperature in the beds. In each run the ratio of decane to water in the feed mixture vaporized was substantially the same, i.e., 30 volumes decane per 80 volumes water. The inlet flow rates and pressure were the same. The gas products were analyzed to determine which operation gave the highest $H_2/CH_4$ ratio. The results are summarized as follows:

TABLE III

| | Runs | | | |
|---|---|---|---|---|
| | A | B | C | D |
| Bed temperature, °F | 500 | 600 | 600 | 700 |
| Space velocities, W./hr./W., hrs.$^{-1}$ | 0.95 | 1.27 | 0.48 | 1.10 |
| Product gas: | | | | |
| Mole percent $H_2$ | 75.6 | 75.0 | 74.9 | 54.3 |
| Mole percent $CH_4$ | 0.44 | 1.0 | 1.4 | 20.6 |
| $H_2/CH_4$ mole ratio | 172 | 75 | 53 | 2.6 |

From such result, operating conditions best suited for obtaining a gas product rich in hydrogen, at least about 75 mole percent, and low in methane, i.e., less than 1 percent methane comprise reaction of the lower reaction temperature below 600° F. and higher space velocities in terms of wt. of hydrocarbon feed per wt. of catalyst per hour, the increased space velocity being obtained preferably by withdrawing the producing gas from the catalyst under a reduced pressure. Thus, in raising the reaction temperature, e.g., in the range of about 300° F. to 500° F., the space velocity should be increased in the range of 0.5 to 1.0 wt. of hydrocarbon feed per unit wt. of catalyst per hour to obtain more selective formation of $H_2$ at conversion levels of 0.2 to 20 percent of the hydrocarbon feed per pass. As the reaction temperature is raised to 600° F. and above the selective formation of $H_2$ is more difficult and especially so if the space velocity is not increased with the aid of reduced pressure on the effluent gas product.

The foregoing discovery is based on the use of the $Ni-Al_2O_3$ catalysts containing 1 to 3 Ni atoms per Al atom with the small amounts of promoter, e.g., 0.5 to 12 wt. percent based on the catalyst that contain 40 to 75 wt. percent Ni.

1. In a process for catalytically reacting a vaporized mixture of normally liquid hydrocarbon and water to form hydrogen-rich gases having low concentrations of carbon monoxide and light hydrocarbons comprising normally gaseous hydrocarbons ranging from methane to butane, the improvement comprising:

flowing the vaporized mixture through a bed of promoted nickel-alumina catalyst having a nickel content ranging from about 40 to 75 wt. percent at temperatures ranging from about 110° F. to 500° F. and pressures ranging from about 5 to 25 p.s.i.a.;

contacting the vaporized mixture with the catalyst for a time sufficient to react about 0.2 to 20 wt. percent of the normally liquid hydrocarbon with water to produce hydrogen-rich gases;

and recovering said hydrogen-rich gases.

2. The process of claim 1 wherein said vaporized mixture of normally liquid hydrocarbon and water is flowed through said bed by continuously withdrawing the partially reacted mixture and hydrogen-rich gases from the bed at pressures below atmospheric pressure.

3. The process of claim 1 wherein said contacting is sustained for a time sufficient to produce hydrogen-rich gases containing at least about 75 mole percent hydrogen and less than about 1 mole percent of said methane on a dry gas basis.

4. The process of claim 3 where said carbon monoxide concentration in said hydrogen-rich gas is negligible.

5. The process of claim 1 wherein the partially reacted mixture and hydrogen-rich gases are withdrawn from said catalyst bed by suction through a cooling zone, and unreacted normally liquid hydrocarbon and water are condensed in said cooling zone.

References Cited
UNITED STATES PATENTS

| 2,064,867 | 12/1936 | Woodhouse | 23—212 |
| 3,106,457 | 10/1963 | Lockerbie | 23—212 |
| 3,251,652 | 5/1966 | Pfefferle | 23—213 |
| 3,320,182 | 5/1967 | Taylor et al | 23—212 XR |

EDWARD STERN, Primary Examiner

U.S. Cl. X.R.

23—150, 212